United States Patent
Dale et al.

(10) Patent No.: US 8,528,954 B1
(45) Date of Patent: Sep. 10, 2013

(54) PINE CONE GRASPING TOOL

(71) Applicants: Connie F. Dale, Riegelwood, NC (US); Joseph N. Carter, Clinton, NC (US)

(72) Inventors: Connie F. Dale, Riegelwood, NC (US); Joseph N. Carter, Clinton, NC (US)

( * ) Notice: Subject to any disclaimer, the term of this patent is extended or adjusted under 35 U.S.C. 154(b) by 0 days.

(21) Appl. No.: 13/748,920

(22) Filed: Jan. 24, 2013

Related U.S. Application Data

(60) Provisional application No. 61/734,271, filed on Dec. 6, 2012.

(51) Int. Cl.
*A01D 51/00* (2006.01)
*E01H 1/12* (2006.01)

(52) U.S. Cl.
USPC ............... 294/209; 294/19.2; 294/210

(58) Field of Classification Search
USPC ............ 294/19.2, 22, 23.5, 175, 191, 209, 294/210, 211; 56/400.12, 332; 81/53.1, 81/53.11
See application file for complete search history.

(56) References Cited

U.S. PATENT DOCUMENTS

| | | | | |
|---|---|---|---|---|
| 209,957 | A * | 11/1878 | Castle | 294/23.5 |
| 560,592 | A * | 5/1896 | Main | 15/212 |
| 1,134,825 | A * | 4/1915 | De Noon | 294/23.5 |
| 2,749,697 | A * | 6/1956 | Poche | 56/328.1 |
| 3,434,753 | A | 3/1969 | De Croes | |
| 3,658,371 | A | 4/1972 | Dowdey | |
| 3,922,026 | A * | 11/1975 | Schweitzer | 294/19.2 |
| 4,322,939 | A * | 4/1982 | McDonald | 56/328.1 |
| 4,663,996 | A * | 5/1987 | Grudgfield et al. | 81/53.11 |
| D300,899 | S | 5/1989 | McVey | |
| D301,674 | S | 6/1989 | Smith et al. | |
| D341,067 | S | 11/1993 | Clark et al. | |
| 5,277,466 | A * | 1/1994 | Wall | 294/19.2 |
| 5,472,251 | A * | 12/1995 | Deininger | 294/19.2 |
| 5,490,701 | A | 2/1996 | Glass | |
| 5,515,574 | A * | 5/1996 | Larson | 16/429 |
| 7,490,879 | B2 | 2/2009 | Seefeldt et al. | |
| 2005/0093312 | A1* | 5/2005 | Dickens | 294/19.1 |
| 2005/0275229 | A1* | 12/2005 | Cvijic | 294/19.1 |
| 2009/0033109 | A1* | 2/2009 | Lipcznski | 294/19.2 |

* cited by examiner

*Primary Examiner* — Dean Kramer
(74) *Attorney, Agent, or Firm* — P. Jeff Martin; The Law Firm of P. Jeffrey Martin, LLC

(57) ABSTRACT

A tool for grasping and holding an article, such as a pine cone. The tool includes an elongated handle which may be telescopically adjustable so as to allow for a plurality of selectively-desired, longitudinal setting positions thereof. A flexibly-resilient, tension-biased grasping mechanism is mounted to a lower end of the handle. The grasping mechanism includes a pair of curvilinear arms for flexibly accommodating and securely grasping a pine cone.

10 Claims, 3 Drawing Sheets

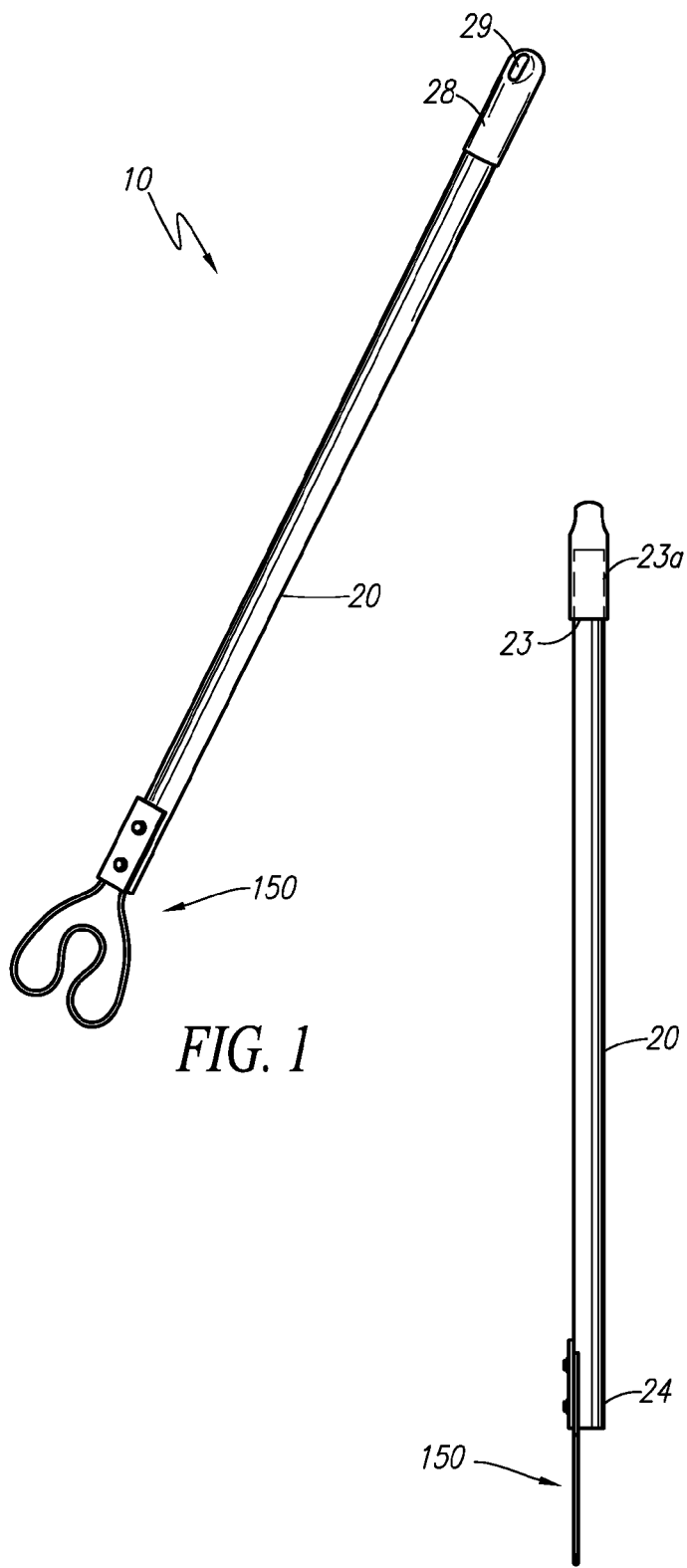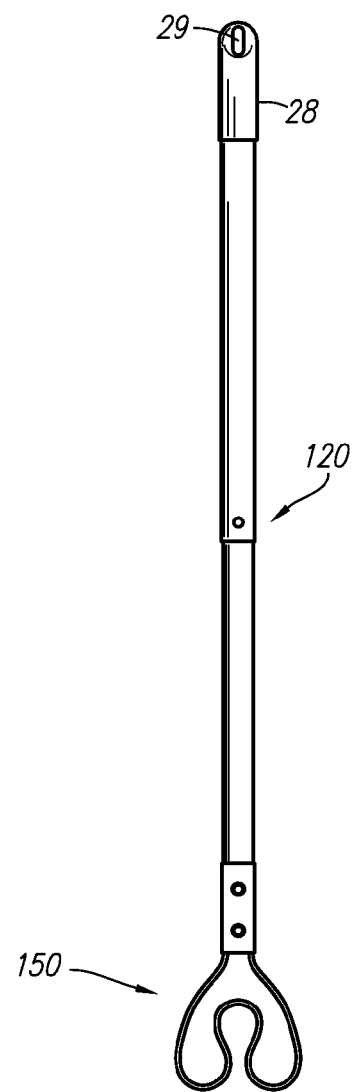
FIG. 1
FIG. 2
FIG. 4

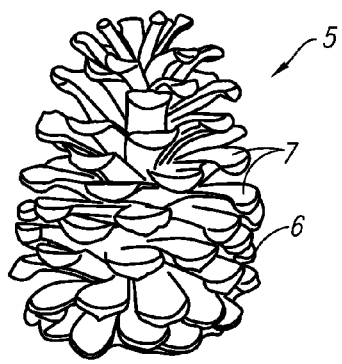
FIG. 3
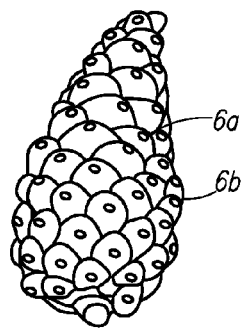
FIG. 3A
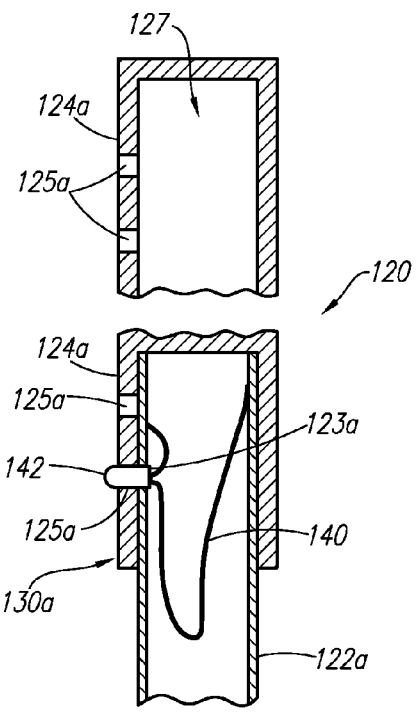
FIG. 7
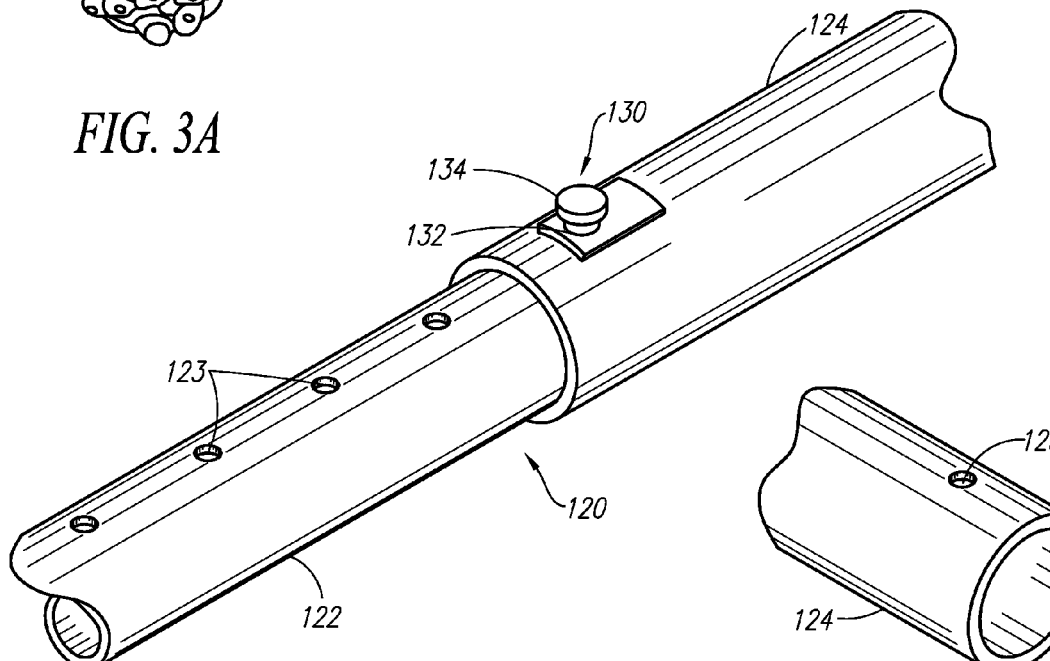
FIG. 5
FIG. 6

PINE CONE GRASPING TOOL

RELATED APPLICATIONS

This application claims priority to U.S. Provisional Patent Application No. 61/734,271, filed on Dec. 6, 2012 and entitled, "Pine Cone Pick Up Tool". The entire contents of which are herein incorporated by reference.

BACKGROUND OF THE INVENTION

1. Field of the Invention

The present invention relates generally to tools and implements, and more particularly, to an improved tool for grasping and holding a pine cone in a securely retained manner.

2. Description of the Related Art

Gymnosperms are plants that produce uncovered seeds in the form of a cone. Conifer trees such as pines, firs, spruces, and balsams are all gymnosperms. Pine cones vary greatly in size and configuration. The rigidity and density of pine cones also vary substantially, and these properties transform through different pine cone life cycle periods. For example, mature pine cones have scales with subtending bracts spirally arranged around a central axis, and the scales are flared, and at times seeds are released. In contrast, premature pine cones are substantially rigid and they remain tightly closed via a resin.

Currently there exist in the art various devices for retrieving and collecting pine cones. However, the prior art has failed to disclose or teach a telescopically adjustable tool having a flexibly-resilient, grasping mechanism in the form of a pair of curvilinear arms for flexibly accommodating and securely grasping a pine cone of all types and developmental stages.

Accordingly, a need exists for an improved tool for grasping and securely holding or retaining an article such as a pine cone. The development of the pine cone grasping tool fulfills this need.

A search of the prior art did not disclose any patents that read directly on the claims of the instant invention; however, the following references were considered related:

U.S. Pat. No. 3,658,371, issued in the name of Dowdey;
U.S. Pat. No. 3,434,753, issued in the name of Croes;
U.S. Pat. No. D341,067, issued in the name of Clark et al.;
U.S. Pat. No. D301,674, issued in the name of Smith et al.;
U.S. Pat. No. 7,490,879 B2, issued in the name of Seefeldt et al.;
U.S. Pat. No. 5,490,701, issued in the name of Glass; and
U.S. Pat. No. D300,899, issued in the name of McVey.

Consequently, a need has been felt for an improved tool for grasping and securely holding or retaining an article such as a pine cone. This application presents claims and embodiments that fulfill a need or needs not yet satisfied by the products, inventions and methods previously or presently available. In particular, the claims and embodiments disclosed herein describe a tool for grasping and securely holding an article, the tool comprising an elongated handle; the handle comprising a means for removably attaching the tool to a vertical surface and a flexibly-resilient, tension-biased grasping mechanism mounted to the lower end of handle, the grasping mechanism comprises a grasping structure which includes a pair of curvilinear arms creating a bulbous, enlarged space to facilitate enhanced flexibility of the curvilinear arms, the tool for grasping and securely holding an article providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Briefly described according to one embodiment of the present invention, a tool for grasping and holding an article, such as a pine cone, is disclosed. The tool comprises an elongated handle which includes a cap securably fitted onto the top end thereof.

In accordance to one embodiment, the elongated handle is telescopically adjustable so as to allow for a plurality of selectively-desired, longitudinal setting positions thereof. The telescopic handle comprises a first elongated cylinder telescopically engageable with a second elongated cylinder. The elongated cylinders are adjustably lockable at a desired longitudinal position or setting via a locking device.

A means for removably attaching the tool to a vertical surface is provided, wherein attachment means, according to one embodiment, comprises a circular or oblong void defined perpendicularly through the cap for receiving a holder, hook, or fastener.

A flexibly-resilient, tension-biased grasping mechanism is disclosed for flexibly accommodating and securely grasping an article, such as trash, round athletic balls, and more particularly, pine cones. The grasping mechanism comprises a unitary structure mounted or suitably affixed to the lower end of the handle. The grasping mechanism includes a mounting plate from which a grasping structure downwardly extends. The mounting plate bifurcates into a pair of curvilinear arms being continuous and joined integrally to the mounting plate.

The curvilinear arms create a bulbous, enlarged space to facilitate enhanced flexibility of the curvilinear arms. A narrow cone entry portal is formed between opposed bottom curved edges of the curvilinear arms which provides direct and open passage to the bulbous, enlarged space.

In order to pick up a pine cone using the tool of the present invention, the user aligns the cone entry portal transverse to the central axis of the pine cone and pushes the handle downward forcefully causing the curvilinear arms to flex divergently and permitting the cone to move upwardly through the cone entry portal and into the bulbous, enlarged space, wherein the curvilinear arms apply a compressional biasing force against the cone, securely retaining the cone between the curvilinear arms.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a front perspective view of a tool for grasping and holding an article, according to one embodiment of the present invention;

FIG. 2 is a left side elevational view of the tool of FIG. 1;

FIG. 3 is a side elevational view of a mature pine cone;

FIG. 3A is a side elevational view of a premature pine cone;

FIG. 4 is a front elevational view of the tool illustrating a telescopic handle thereof, according to one embodiment of the present invention; and FIG. 5 is a partial perspective view of a telescopic handle disposed with a locking device, in accordance to one embodiment of the present invention;

FIG. 6 is a partial perspective view of the outer cylinder of the telescopic handle of FIG. 5 illustrating the hole defined axially through both sides of the outer cylinder;

FIG. 7 is a partial, longitudinal sectional view of a telescopic handle disposed with a locking device, in accordance to another embodiment of the present invention;

DESCRIPTION OF THE PREFERRED EMBODIMENT

Detailed Description of the Figures

Figure 8:
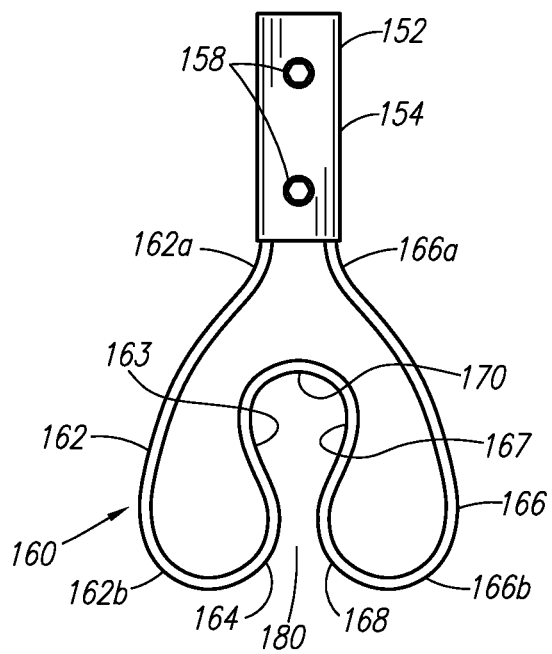
FIG. 8 is a front elevational view of the grasping mechanism, in accordance to one embodiment of the present invention.

Referring now to FIGS. 1-3A, a tool for grasping and holding an article, such as a pine cone 6, is shown according to one embodiment of the present invention.

The tool for grasping and holding an article 10, hereinafter "tool 10", comprises an elongated handle 20 which includes an upper end 23 opposing a lower end 24. The handle 20 further comprises a cap 28 securably fitted onto the top end 23a thereof. The tool 10 of the present invention may be removably attached to a vertical surface, such as a wall (not shown), via passage of a holder, hook, or fastener (not shown) through a circular or oblong void 29 defined perpendicularly through the cap 28. The circular or oblong void 29 providing a means for removably attaching the tool 10 to a surface, thereby facilitating quick, easy, and efficient storage of tool 10.

In reference to FIGS. 4-6, and in accordance to another embodiment, the handle 120 is telescopically adjustable so as to allow for a plurality of selectively-desired, longitudinal setting positions thereof. The handle 120 comprises a linearly elongated inner cylinder 122 telescopically received by a linearly elongated outer cylinder 124. The outer cylinder 124 includes a cylinder receiving cavity 127 for intimate slidable engagement by the inner cylinder 122.

The inner cylinder 122 is adjustably lockable to outer cylinder 124 at a desired longitudinal position or setting via a locking device 130. In accordance to one embodiment, the locking device 130 is disclosed as a spring-biased pin assembly 132 disposed about the outer cylinder 124. The outer cylinder 124 includes a hole 125 defined axially through both sides thereof, and the inner cylinder 122 includes a series of holes 123 defined through both sides thereof in corresponding relation so that a pin 134 of pin assembly 132 may be utilized to secure the outer cylinder 124 and inner cylinder 122 at a desired longitudinal position. More specifically, the pin 134 extends through hole 125 of outer cylinder 124 and engages a selected hole 123 defined through both sides of inner cylinder 122 and exits hole 125 of opposing side of outer cylinder 124. Thus, the holes 123 of inner cylinder 122 cooperate with the pin 134 of pin assembly 132 that permits the pin 134 to extend initially through the hole 125 of outer cylinder 124, through a selected hole 123 of inner cylinder 122, and through hole 125 of opposing side of outer cylinder 124, thereby securing the inner and outer cylinders 122 and 124 to one another.

In a resting position, pin 134 is urged by a spring (not shown) inwardly towards the cylinder receiving cavity 127 of outer cylinder 124. In order to adjustably secure the inner and outer cylinders 122 and 124 of handle 120 to a selectively-desired longitudinal setting, the pin 134 is retracted or pulled axially until pin 134 is effectively removed from the inner cylinder 122, and pin 134 is held in such retracted position, while the inner and outer cylinders 122 and 124 are telescopically adjusted relative to one another to a desired handle 120 length. Upon obtaining desired handle 120 length or longitudinal setting, operator releases pin 134 to allow pin 134 to engage one of the holes 123 of inner cylinder 122.

In reference to FIG. 7, in accordance to another locking device 130a embodiment, locking device 130a comprises a generally conical-shaped spring member 140 mounted to an inner surface of inner cylinder 122a, the spring member 140 includes a button 142 protruding integrally outward therefrom and through an aperture 123a defined axially through a sidewall of inner cylinder 122a. In further accordance to this particular embodiment, the outer cylinder 124a includes a series of apertures 125a defined through at least one sidewall thereof in corresponding relation so as to allow the button 142 to extend through aperture 123a of inner cylinder 122a and to engage and exit a selected aperture 125a of outer cylinder 124a, thereby removably securing the outer cylinder 124a and inner cylinder 122a at a desired longitudinal position. A distal segment of spring member 140 extends and engages the inner surface of inner cylinder 122a to bias the button 142 into a selected aperture 125a of outer cylinder 124a.

Figure 9:
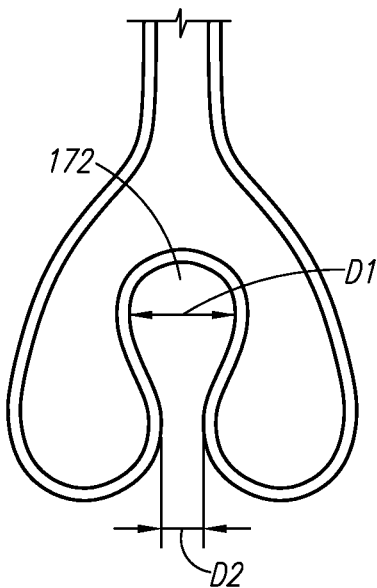
FIG. 9 is partial front elevational view of the grasping mechanism illustrating the bulbous, enlarged space thereof.

Referring now more specifically to FIGS. 1, 2, 4, and 8-9, a flexibly-resilient, tension-biased grasping mechanism 150 is disclosed for flexibly accommodating and securely grasping an article 5, such as trash pieces (e.g., wadded paper, cans, bottles), round athletic balls (e.g., golf balls, baseballs, softballs, tennis balls), and more particularly, a pine cone 6, in a tension-biased manner. The grasping mechanism 150 comprises a unitary structure, or otherwise defined as a one-piece grasping mechanism 150, mounted or suitably affixed to the lower end 24 of handle 20. The grasping mechanism 150 comprises an upper section 152 from which a grasping structure 160 downwardly extends. The upper section 152 is defined as a mounting plate 154 bifurcating into a pair of curvilinear arms 162, 166, the curvilinear arms 162, 166, the pair of curvilinear arms 162, 166 being continuous and joined integrally to the mounting plate 154. Alternatively, the pair of arms 162, 166 may be suitably mounted to a separate mounting plate 154 via a fastener 158, such as a nut and bolt assembly, or via arc welding. The mounting plate 154 is shaped so as to snugly conform to and match the outer surface shape and contour defining the lower end 24 outer surface of handle 20, e.g. arcuate or planar.

The handle 20 and grasping mechanism 150 may be constructed from a material selected from the group comprising plastic, thermoplastic, metal or a metallic-plastic composite. Preferred plastic and thermoplastic construction materials may be selected from the group comprising polystyrene, polyvinyl chloride (PVC), polypropylene, polyolefin, acrylonitrile-butadiene-styrene (ABS), polyethylene, polyurethane, polycarbonate, or blends thereof, and ABS/Nylon blend. Metal construction materials may be selected from the group comprising iron, aluminum, steel, metallic compounds, and alloys.

In the event plastic is the selected construction material, the handle 20 and grasping mechanism 150 may be constructed utilizing a common molding process such as injection molding, blow molding, extrusion, or other molding and fabricating methods.

Each the first curvilinear arm 162 second curvilinear arm 166 comprises an anterior section 162a, 166a and a posterior section 162b, 166b, respectively. The first curvilinear arm 162 extends downward from plate 154 and curves inward from a smaller transverse width at the anterior section 162a thereof to a greater transverse width at the posterior section 162b thereof, the first curvilinear arm 162 extending and curving upwardly about the posterior section 162b and tapers inward at a medial section 163 and extending upwardly curvilinear therefrom to a convergence 170.

The second curvilinear arm 166 is a mirror image of the first curvilinear arm 162, wherein the second curvilinear arm 166 extends downward from plate 154 and curves inward from a smaller transverse width at the anterior section 166a thereof to a greater transverse width at the posterior section 166b thereof, the second curvilinear arm 166 extending and curving upwardly about the posterior section 166b and tapers inward at a medial section 167 and extending upwardly curvilinear therefrom to the convergence 170. The spaced distance D1 between the facially-adjacent arms 162, 166 is substantially greater than the spaced distance D2 between the facially-adjacent arms 162, 166.

The medial sections 163, 167 of the curvilinear arms 162, 166, respectively, create a bulbous, enlarged space 172 to facilitate enhanced flexibility of the curvilinear arms 162, 166. A narrow cone entry portal 180 is formed between opposed bottom curved edges 164, 168 of the curvilinear arms 162, 166, respectively, the cone entry portal 180 providing direct and open passage to the bulbous, enlarged space 172.

Figure 10:
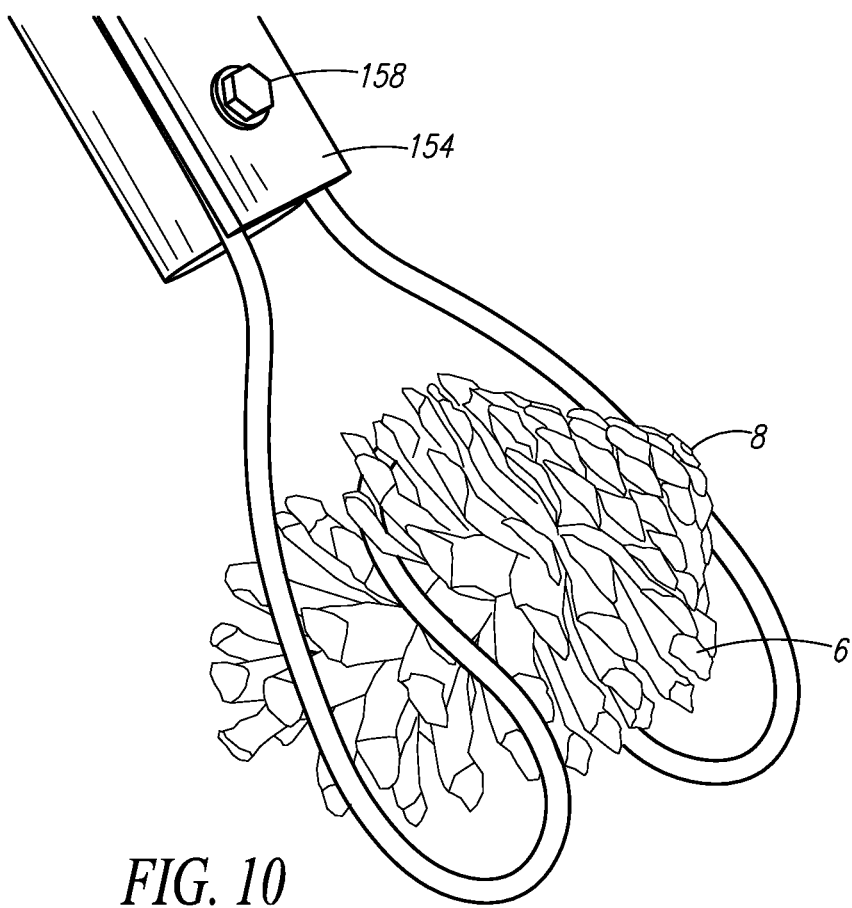
FIG. 10 is a partial perspective view illustrating a pine cone securely retained by the grasping structure, in accordance to one embodiment of the present invention.

Referring now to FIGS. 1-3, 4, and 8-10, in order to pick up a mature pine cone 6 using the tool 10 of the present invention, the operator grasps the handle 20, aligns the cone entry portal 180 transverse (or perpendicularly) to the central axis 8 of the pine cone 6 and aligns the opposed bottom curved edges 164, 168 of the curvilinear arms 162, 166, respectively, between cone 6 scales 7. Operator then pushes handle 20 using a downward force causing the curvilinear arms 162, 166 to flex divergently and permitting the cone 6 to move upwardly through the cone entry portal 180 and into the bulbous, enlarged space 172, wherein the curvilinear arms 162, 166 apply an inwardly-directed or compressional biasing force against the cone 6 between the flared or expanded scales 7 thereof, securely retaining the cone 6 between the curvilinear arms 162, 166. Finally, operator may then remove the cone 6 from between the curvilinear arms 162, 166. Being flexibly-resilient, the curvilinear arms 162, 166 flexibly return to a relaxed, resting configuration existing prior to divergent flexion, the relaxed, resting configuration as illustrated in FIG. 1.

Referring now to FIGS. 1, 2, 3A, 4, and 8-9, in order to pick up a premature pine cone 6a using the tool 10 of the present invention, the operator grasps the handle 20, aligns the cone entry portal 180 transverse (or perpendicularly) generally about a center of the pine cone body 6b. Operator then pushes handle 20 using a downward force causing the curvilinear arms 162, 166 to flex divergently and permitting the cone 6a to move upwardly through the cone entry portal 180 and into the bulbous, enlarged space 172, wherein the curvilinear arms 162, 166 embrace the cone body 6b surface in a tension-biased manner, or more specifically, the curvilinear arms 162, 166 apply an inwardly-directed or compressional biasing force against the cone body 6b, securely retaining the cone 6a between the curvilinear arms 162, 166.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A tool for grasping and holding an article, the tool comprising:
   an elongated handle, the elongated handle comprising:
      an upper end opposing a lower end, the upper end having a top;
      and
      a cap securably fitted onto the top; and
   a flexibly-resilient, tension-biased grasping mechanism mounted to the elongated handle, the grasping mechanism is mounted to the lower end of the elongate handle, the grasping mechanism is defined as unitary or one-piece, the grasping mechanism comprises an upper section from which a grasping structure downwardly extends, wherein the upper section is defined as a mounting plate, the mounting plate bifurcates into a pair of curvilinear arms, the pair of curvilinear arms being continuous and joined integrally to the mounting plate, and wherein the pair of curvilinear arms comprises a first curvilinear arm and a second curvilinear arm, the first curvilinear arm comprises an anterior section and a posterior section, the first curvilinear arm extends downward from the mounting plate and curves inward from a smaller transverse width at the anterior section thereof to a greater transverse width at the posterior section thereof, the first curvilinear arm extending and curving upwardly about the posterior section and tapers inward at a medial section and extending upwardly curvilinear therefrom to a convergence.

2. The tool of claim 1, wherein the second curvilinear arm comprises an anterior section and a posterior section, the second curvilinear arm extends downward from the mounting plate and curves inward from a smaller transverse width at the anterior section of the second curvilinear arm to a greater transverse width at the posterior section of the second curvilinear arm, the second curvilinear arm extending and curving upwardly about the posterior section of the second curvilinear arm and tapers inward at a medial section of the second curvilinear arm and extending upwardly curvilinear therefrom to the convergence.

3. The tool of claim 2, wherein the medial sections of the first curvilinear arm and the second curvilinear arm, respectively, create a bulbous, enlarged space to facilitate enhanced flexibility of the first curvilinear arm and the second curvilinear arm.

4. The tool of claim 3, wherein the first curvilinear arm comprises a bottom curved edge and the second curvilinear arm comprises a bottom curved edge, wherein the bottom curved edge of the first curvilinear arm opposes the bottom curved edge of the second curvilinear arm forming a narrow cone entry portal there between, the cone entry portal providing direct and open passage to the bulbous, enlarged space.

5. The tool of claim 4, wherein the first curvilinear arm and the second curvilinear arm flex divergently in response to a downward force applied thereto, thereby increasing a spaced distance of the cone entry portal and permitting the article to move upwardly therethrough and into the bulbous, enlarged space, wherein the first curvilinear arm and second curvilinear arm apply a compressional biasing force against the article, securely retaining the article between the first curvilinear arm and the second curvilinear arm.

6. The tool of claim 5, wherein the first curvilinear arm and the second curvilinear arm flexibly return to a relaxed, resting configuration existing prior to divergent flexion thereof upon removal of the article from between the first curvilinear arm and the second curvilinear arm.

7. The tool of claim 5, wherein the article is a pine cone.

8. The tool of claim 1, further comprising means for removably attaching the tool to a vertical surface.

9. A tool for grasping and holding an article, the tool comprising:
   an elongated handle, the handle being telescopically adjustable so as to allow for a plurality of selectively-desired, longitudinal setting positions of the handle, the handle comprising:
      an upper end opposing a lower end, the upper end having a top;
      and
      a cap securably fitted onto the top; and
   a flexibly-resilient, tension-biased grasping mechanism mounted to the lower end of the handle, the grasping mechanism comprises an upper section from which a grasping structure downwardly extends, the upper section is defined as a mounting plate, the mounting plate bifurcates into a pair of curvilinear arms, wherein the pair of curvilinear arms being continuous and joined integrally or suitably affixed to the mounting plate, the handle further comprises a first elongated cylinder telescopically engageable with a second elongated cylinder, the elongated cylinders are adjustably lockable at a desired longitudinal position or setting via a locking device, the locking device comprises a spring-biased locking assembly, and wherein the pair of curvilinear arms comprises:
   a first curvilinear arm, the first curvilinear arm comprises an anterior section and a posterior section, the first curvilinear arm extends downward from the mounting plate and curves inward from a smaller transverse width at the anterior section thereof to a greater transverse width at the posterior section thereof, the first curvilinear arm extending and curving upwardly about the posterior section and tapers inward at a medial section and extending upwardly curvilinear therefrom to a convergence; and
   a second curvilinear arm, the second curvilinear arm comprises an anterior section and a posterior section, the second curvilinear arm extends downward from the mounting plate and curves inward from a smaller transverse width at the anterior section of the second curvilinear arm to a greater transverse width at the posterior section of the second curvilinear arm, the second curvilinear arm extending and curving upwardly about the posterior section of the second curvilinear arm and tapers inward at a medial section of the second curvilinear arm and extending upwardly curvilinear therefrom to the convergence.

10. The tool of claim 9, wherein the medial sections of the first curvilinear arm and the second curvilinear arm, respectively, create a bulbous, enlarged space to facilitate enhanced flexibility of the first curvilinear arm and the second curvilinear arm, the first curvilinear arm comprising a bottom curved edge and the second curvilinear arm comprising a bottom curved edge, and wherein the bottom curved edge of the first curvilinear arm opposes the bottom curved edge of the second curvilinear arm forming a narrow cone entry portal there between, the cone entry portal providing direct and open passage to the bulbous, enlarged space.

* * * * *